(12) United States Patent
Vimpari et al.

(10) Patent No.: US 6,169,883 B1
(45) Date of Patent: Jan. 2, 2001

(54) REMOTE TEST OF A SUBSCRIBER CONNECTION IN A SYSTEM IMPLEMENTING A WIRELESS SUBSCRIBER CONNECTION

(75) Inventors: Markku Vimpari; Pekka Väyrynen, both of Oulu; Heimo Lähdemäki, Vermuntila, all of (FI)

(73) Assignee: Nokia Telecommunications Oy, Espoo (FI)

( * ) Notice: Under 35 U.S.C. 154(b), the term of this patent shall be extended for 0 days.

(21) Appl. No.: 08/811,764

(22) Filed: Mar. 6, 1997

(30) Foreign Application Priority Data

Mar. 7, 1996 (FI) ........................................ 961074
Sep. 30, 1996 (FI) ....................................... 963911

(51) Int. Cl.[7] .................................................. H04Q 7/20
(52) U.S. Cl. ........................ 455/67.1; 455/423; 455/425; 379/27
(58) Field of Search .................................... 455/423, 425, 455/67.1, 557; 379/27, 32, 412, 394, 413, 3, 405, 402, 30, 29, 26, 34; 340/539, 636

(56) References Cited

U.S. PATENT DOCUMENTS

| | | | |
|---|---|---|---|
| 4,449,246 | | 5/1984 | Seiler et al. . |
| 4,517,512 | * | 5/1985 | Petrich et al. ........................ 714/724 |
| 4,622,438 | | 11/1986 | Shimizu et al. . |
| 5,134,643 | * | 7/1992 | Iwata .................................... 455/423 |
| 5,142,563 | * | 8/1992 | Nyuu et al. ........................... 455/343 |
| 5,603,095 | * | 2/1997 | Uola .................................... 455/67.1 |
| 5,673,272 | * | 9/1997 | Proskauer et al. ................... 395/704 |
| 5,703,929 | * | 12/1997 | Schillaci et al. ..................... 455/423 |
| 5,774,526 | * | 6/1998 | Propp et al. .......................... 455/402 |
| 5,859,894 | * | 1/1999 | Ortiz Perez et al. ................. 379/27 |
| 5,889,837 | * | 3/1999 | Sands .................................... 455/425 |
| 5,905,963 | * | 5/1999 | Lysejko ............................... 455/67.1 |

FOREIGN PATENT DOCUMENTS

| | | |
|---|---|---|
| 0 460 486 | 12/1991 | (EP) . |
| 0 543 161 A2 | 5/1993 | (EP) . |
| 0 673 176 | 9/1995 | (EP) . |
| 0 720 407 A2 | 7/1996 | (EP) . |
| 0 730 388 | 9/1996 | (EP) . |
| 0 734 192 | 9/1996 | (EP) . |
| 2 301 742 | 12/1996 | (GB) . |
| WO 94/22255 | 9/1994 | (WO) . |
| WO 95/09512 | 4/1995 | (WO) . |
| WO 96/38012 | 11/1996 | (WO) . |

* cited by examiner

*Primary Examiner*—Nay Maung
*Assistant Examiner*—Jean Gelin
(74) *Attorney, Agent, or Firm*—Altera Law Group, LLC

(57) ABSTRACT

The invention concerns a system implementing a wireless subscriber connection and comprising base stations and wireless terminals. The terminal contains functions which may be used for testing the terminal, the subscriber terminal equipment and the connection between them in response to a message which is received via a radio path and which starts the test functions, and which transmit the test results to a radio link. The terminal contains a subscriber line interface circuit (SLIC) with which the subscriber terminal equipment may be connected to the terminal. A connecting line may be used for connecting. Means for generating an alternating voltage may be connected in parallel with the input of the subscriber line interface circuit (SLIC) and the connecting line. A table is stored in the terminal's memory containing function specifications, and in response to the message starting the test functions the terminal searches the table for the function specification and performs the test tasks according to the specification. The tasks also comprise loop measurements.

7 Claims, 6 Drawing Sheets

| CHANNEL NUMBER | PREFIX | TRAFFIC AREA NUMBER | TELEPHONE INDENTIFIER | INFORMATION |
|---|---|---|---|---|
| 3 digit | 3 digit | | 7 digit | 3 digit |

| CHANNEL NUMBER | PREFIX | TELEPHONE INDENTIFIER | INFORMATION |
|---|---|---|---|
| 3 digit | 1 digit | 7 digit | 5 digit | ns
REMOTE TEST OF A SUBSCRIBER CONNECTION IN A SYSTEM IMPLEMENTING A WIRELESS SUBSCRIBER CONNECTION

FIELD OF THE INVENTION

This invention concerns testing of a subscriber connection in a system implementing a wireless subscriber connection and comprising base stations and wireless terminals to which a subscriber terminal equipment is connected and wherein a part of the subscriber connection is formed by radio link between the terminal equipment and the base station.

BACKGROUND OF THE INVENTION

In fixed telephone networks the subscriber line network is formed so that twin cables from several subscriber terminal equipments are taken into a crossbar switch, cables from several crossbar switches are combined in another crossbar switch and a cable from this is taken to an exchange. The signalling interface facing the subscriber lines of the exchange is standardized and is either a connection of 2-wire analog subscriber lines, a multiplexer interface in accordance with the CCITT V2 recommendation or a message-based multiplexer interface in accordance with the ETSI V5.1 recommendation. Subscriber lines are a big cost item both in the building of the network and in its maintenance. The condition of subscriber lines must be monitored constantly by performing automatic loop measurements. In all exchanges, whether the exchange is a local one or a PBX exchange, each subscriber line is connected to the exchange by way of the SLIC (Subscriber Line Interface Circuit). The SLIC circuit performs the so-called BORSHT functions, which are Battery Feed, Overvoltage Protection, Ringing, Supervision, Hybrid and Test. There is a good commercial supply of integrated SLIC circuits.

Figure 1:
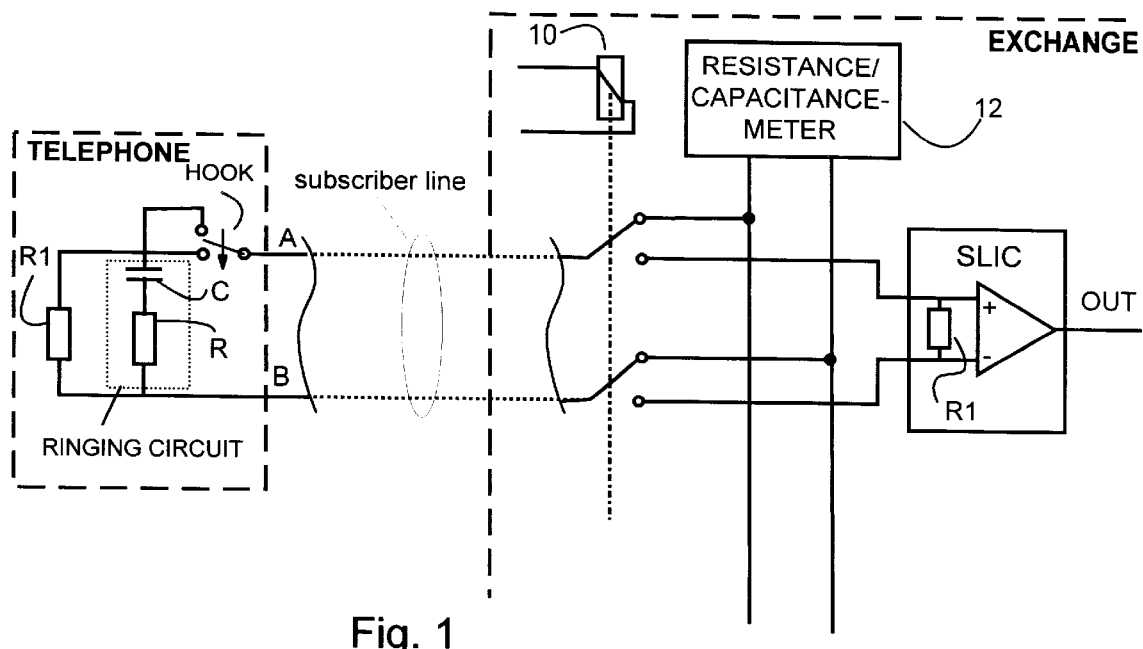

FIG. 1 illustrates a known arrangement for testing the condition of a subsriber line. The typical telephone in a fixed network can be represented by terminating resistor R1 for the purpose of loop measurements and by a ringing circuit formed by capacitance C and resistor R.

In impedance measurement performed with direct voltage the exchange sees the telephone as a very high impedance in an on-hook state. This is due to the ringing circuit capacitance. When the hook is off, the ringing circuit does not affect, whereby the telephone is seen as a low resistance. In the SLIC circuit there is a loop identification based on a comparison of the subscriber line's current consumption with the limit value. This function finds out the on-hook or off-hook state.

For measurements at audio frequency the impedance of the line telephone and the SLIC impedance are clearly defined in standards. In most countries 600 W is defined as the terminal impedance for the telephone's audio range in the off-hook state, even if differences exist between countries. Depending on the frequency, the audio range impedance in the on-hook state is in the magnitude of 1.5 kOhm. Thus, in FIG. 1 terminal resistance R1, depending on the situation, is a direct voltage impedance or an alternating voltage impedance with the hook off.

The telephone is connected to the exchange with a subscriber line, which is usually a twin cable AB. Directed by a special relay 10, subscriber line AB is branched before the SLIC circuit in the exchange to measuring device 12, which measures the subscriber loop resistance and capacitance. Of the SLIC circuit only the receiver circuit is shown. By disconnecting the subscriber line from the SLIC input with a relay, the measuring device is able to measure the subscriber loop resistance using direct voltage, whereby a possible short-circuit is detected, and to measure the capacitance using alternating voltage, thus finding out the condition of the telephone's ringing circuit. Often the loop's resistance to earth is also measured to find out possible earth faults. It should be noted that by using just one measuring device it is possible in the exchange to perform loop measurements of a great number of subscriber connections.

In building a telephone network the installation of subscriber lines between the exchange and the subscriber terminal equipments is both a considerable cost item and a work demanding much time. Especially in a region with scarce population the costs for the individual connection may become big. One solution for bringing down costs is by replacing the fixed subscriber loop between exchange and subscriber terminal equipment for radio link. Hereby the subscriber terminal equipment in the fixed network is connected to a terminal unit containing a radio transmitter/receiver and converting the audio-frequency signal of the subscriber terminal equipment into a radio-frequency signal and transmitting it by radio to the base station and, correspondingly, converting the received radio-frequency signal into an audio-frequency signal which the subscriber terminal equipment will understand.

In a solution of this kind the radio system may be a pure analog or digital cellular system, wherein the terminal units are communicating with the base station, or it may be a modified cellular system from which some network elements have been removed and some functions have been simplified. In the present application this solution is called WLL or Wireless Local Loop System.

The WLL system may be constructed in such a way that structural parts of some existing cellular system are applied. A mobile telephone system may be, for example, an analog NMT or TACS system or a digital GSM system. Hereby, the signalling of the WLL system is in accordance with the system in question, base stations are standard base stations of the system in question and the radio unit of the terminal is similar to the radio unit of a mobile station or the terminal may be the mobile station in a mobile telephone system. The important component of the WLL system is the subscriber network element which connects subscribers to a local exchange meeting the standards. In a pure cellular system it is a mobile switching center and in an applied system it is a network element to be described later. The subscriber network element changes the signalling of the WLL network, for example, NMT or GSM signalling, into signalling suitable for the fixed network (for example, PSTN) and, correspondingly, it adapts the signalling of the fixed network to the WLL network interface.

Figure 2:
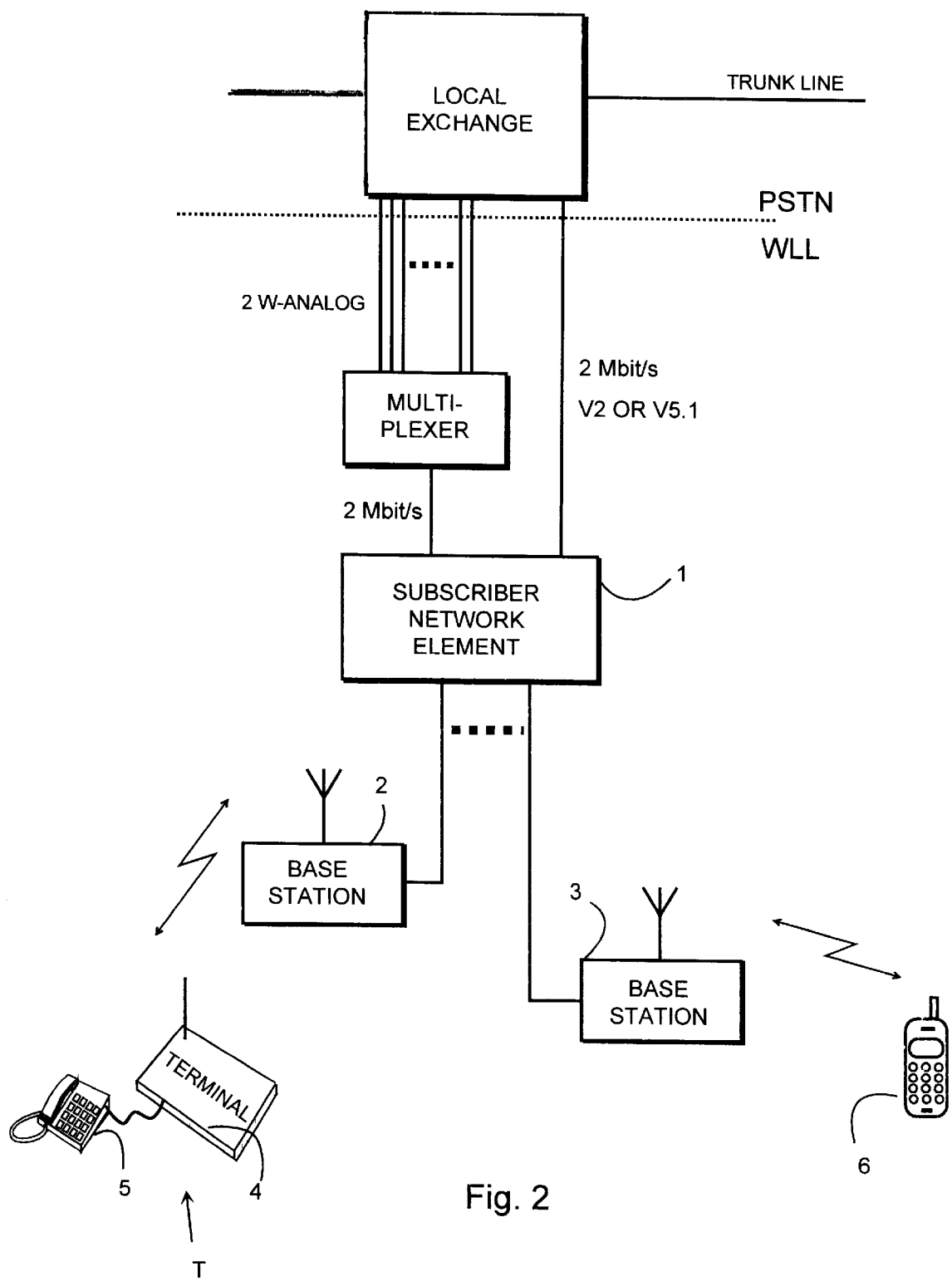

FIG. 2 shows a principle of the WLL system. A wireless fixed terminal T comprises a radio unit with an aerial and a telephone adaptor 4 connecting a standard subscriber terminal equipment 5 to the terminal. The subscriber terminal equipment may be an ordinary telephone set, a telefax or a modem. It is connected to the terminal by pushing a standard connecting plug into the terminal's adaptor connection. The user uses subscriber terminal equipment 5 as in an ordinary fixed network, although a main part of the subscriber line connection is formed by the radio link between terminal T and base station 2 or 3. The subscriber terminal equipment and the terminal may be combined to form a single physical device 6, for example, as a mobile station used in that system on which the WLL system is based. Each base station may serve numerous subscriber terminal equipments. The base stations are connected to a special subscriber network element 1 which for its part is connected to a standard telephone exchange.

The terminal receives its power supply either directly from the power supply mains, if one is available at the terminal's place of location, or from a battery. In the former case a standby battery is also used and a charger then keeps the standby battery charged. In case of power failure the terminal will have its power supply from the battery and will thus be able to continue its operation.

Network element 1 is connected to a local exchange with a multiplexer connection using an open 2 Mbit/s PCM system of the V2 or V5.1 type. If the local exchange supports a 2-wire connection only, the network element is connected to the exchange by converting the V2 signalling into an analog 2-wire subscriber connection interface. Signalling between the network element and the base stations connected to it is the signalling of the applied mobile telephone network, however, modified in such a way that functions typical of the cellular network, such as cell handover and roaming, are left out. Thus, the subscriber must stay in the coverage area of his named base station. Routing of incoming and outgoing calls is based on the subscriber file of the network element. The operation of the network element is similar to the operation of a concentrator: a call is routed from the subscriber connection to the exchange while analysis of numbers, calculation and other functions are performed in the exchange.

In accordance with the above, a WLL network may be based on the known GSM system. GSM is a digital cellular system based on time division multiple access wherein a traffic channel TCH is always allocated together with a SACCH (Slow Associated Control Channel) connected to it. The mobile station must measure the power of the received signal, signal strength of BCCH carriers of neighbour base stations, and it must calculate the bit error ratio describing the quality of the received signal. It must report measurement results in accordance with the GSM recommendation no less than once a second on the above-mentioned SACCH (Slow Associated Control Channel). If the SACCH channel is used only for the purpose of reporting, the mobile station may report measurement results twice a second. In a WLL application the terminal may perform the same measurements as the mobile station, although measurements relating to handover are unnecessary.

It is true that the WLL system is able from the measurement results transmitted by the terminal in some degree to conclude whether there are errors in the terminal's operation. If no results are received, then it is of course obvious that the terminal is not operating. But the system will not know whether there are disturbances in ringing, in the passing on of DTMF signals, in responses to on-hook and off-hook signals of the subscriber terminal equipment etc. In addition, the system is not able to find out if there are faults in the operation of the subscriber terminal equipment. The subscriber terminal equipment, which may be a conventional fixed network telephone, may be short-circuited, its hook is left off, the plug is not connected to the terminal etc. Nor has the system any means for finding out whether the terminal's standby battery is okay and whether the battery charger is operating as it should. In some cases the subscriber, without the operator knowing, may use batteries of a wrong type which may cause disturbances in the terminal's operation. The subscriber makes an error report to the operator who must then find out the cause of the trouble, which is simple as such.

The international patent application WO 94/22255, applicant Telular International, Inc., describes a testing device suitable for a system of the WLL type which automatically performs programmed tests on the terminal. Physically connected to the terminal, the testing device monitors the operation of the terminal and the radio unit, adaptor and power supply and checks whether their operation is correct. When connected to the adaptor it simulates functions of the subscriber terminal equipment (telephone, modem, fax) concluding from responses of the adaptor whether the adaptor is working as it should. It should be mentioned as regards simulation that the testing device generates an off-hook signal for the adaptor and checks whether the adaptor responds with a dialling tone. It directs the ringing tone generated by the adaptor to the terminal, then generates an off-hook signal and checks whether the adaptor turns off the ringing tone in response to the off-hook signal. The testing device may connect to a transmitter/receiver and command it to generate an outgoing call to its own number, in other words, to call through the network to itself, whereby the device checks whether the transmitter/receiver generates a busy tone in response to the call.

The prior art testing device has some drawbacks. Firstly, the network operator can not start a test sequence by remote control nor receive test results concerning the terminal's operation, but the test takes place locally either automatically or started by the user. It notifies the party ordering the connection of the test results, for example, by indicator lights. Secondly, the testing device does no test at all on the operation of the terminal and of the subscriber line connecting this to the subscriber terminal equipment, nor this way the operation of the subscriber terminal equipment, so when a fault occurs in the subscriber line or in the subscriber terminal equipment, the user must call for a service man. This is unnecessary, for example, if the telephone plug is not pushed well into the adaptor. Thirdly, the operator may need to perform loop measurements on the subscriber line, as is done also on the fixed network, but this is not possible in the WLL system, because a part of the subscriber line is radio link. Should the known method shown in FIG. 1 be applied, this would mean that every WLL terminal ought to have its own resistance/capacitance meter. This would be economically expensive and yet there are no means of passing on measurement data to the operator. Fourthly, it is not possible with the testing device to test the condition of the terminal's standby battery.

Thus, it is an objective of the present invention to bring about a method of testing the operation of both the terminal and its standby battery and the condition of the subscriber line and subscriber terminal equipment and where the test may be started by radio from the network and the test results passed on by radio to the network. A connection implementing the method is another objective.

The established objectives are achieved through solutions defined in the independent claims.

BRIEF SUMMARY OF THE INVENTION

According to the invention, a connection arrangement is contained in a WLL terminal to receive from the network a test message transmitted to it by using a suitable protocol, to perform diagnosing functions stated in the message and to transmit the results to the network using a suitable protocol.

Diagnosing functions include a terminal test which may contain tests of the same type as those performed in a prior art arrangement, such as on-hook/off-hook measurements and signal level measurements. In particular, diagnosing functions include loop measurements of the subscriber loop and a function checking the condition of the terminal's standby battery.

To carry out loop measurement the connection arrangement contains a SLIC circuit, which is used to perform the subscriber connection, that is, the twin cable from the subscriber terminal equipment is brought to this circuit. In parallel with the 2-wire input of the SLIC circuit and with the subscriber line a series connection is located which comprises a signal generator and a resistance. The resistance value is approximately the same as the input impedance of the SLIC circuit. The signal generator supplies an alternating voltage to the subscriber line, which depending on the purpose of measurement is either of a low frequency or of a high frequency. The state of the subscriber loop determines the effect of the supplied signal in the SLIC input and, correspondingly, in its output. Results of low and high frequency measurements are compared with each other and it is easy to find out from these results if there is a short-circuit in the subscriber line, if the line has broken, if the telephone is off-hook and if the telephone's ringing circuit is faulty.

The SLIC circuit itself contains a loop identification based on a comparison of the subscriber line's current consumption with a limit value. This function finds out whether the hook is off or on. Digital terminals already use a signal processor to which an A/D converter, usually a PCM codec, is connected which for its part is connected to the SLIC output. The signal processor may be given the task to perform necessary calculations. A separate calculation circuit may be used in analog terminals.

For finding out the condition of the standby battery, such a logic unit is added to the terminal or to its power supply unit, which performs a battery condition test in response to a message from the network which starts the test. The test includes at least a battery load test. The terminal then forms a message wherein information on the battery condition is transmitted to the network.

For sending messages starting the test from the network to the terminal and, correspondingly, for sending reports from the terminal to the network, the cellular network's existing protocol is used, if at all possible. An analog NMT network uses certain frames defined in the specifications. A digital network uses a SMS protocol (Short Message Service) or any transmission protocol developed on a SMS basis. The test may be started by some network element, such as, for example, a remote operation center or a subscriber network element, but a base station may also start the test and analyze the results. Another applicable protocol used in a digital cellular network is called Unstructured Supplementary Service Data (USSD). This protocol has been proposed by European Telecommunication Standards Institute (ETSI) in the specification ETS 300 625, January 1995. Both a mobile station and the network are able to form, send and receive unstructured strings. After the mobile station has received the string, it realises operations instructed by the network, forms a new string including results and send the string to the network.

After the terminal has received the test message it searches that function specification from a stored table to which there is a reference in the message and performs the tasks defined in the specification. Upon completion of the task and calculation of the results the terminal forms a message according to the protocol and transmits it to the network.

Test functions of the terminal may be started as required either with regular repetition, at a certain time only, such as in the night, and concerning some terminals only, or concerning all terminals. A test instruction may concern an individual measurement or a whole series of measurements.

LIST OF FIGURES

Figure 3:
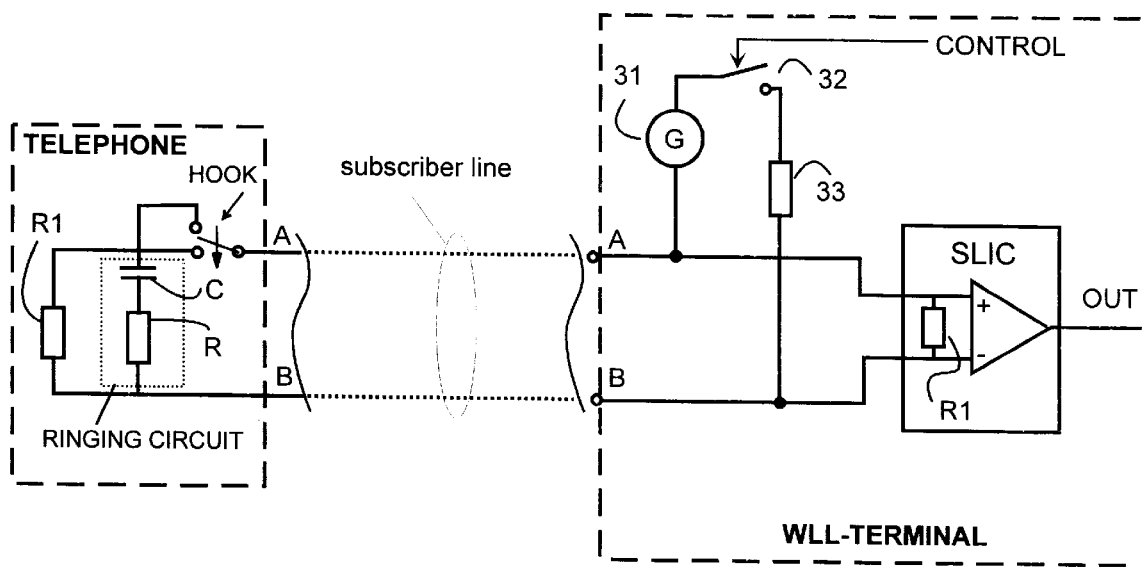
Figure 4:
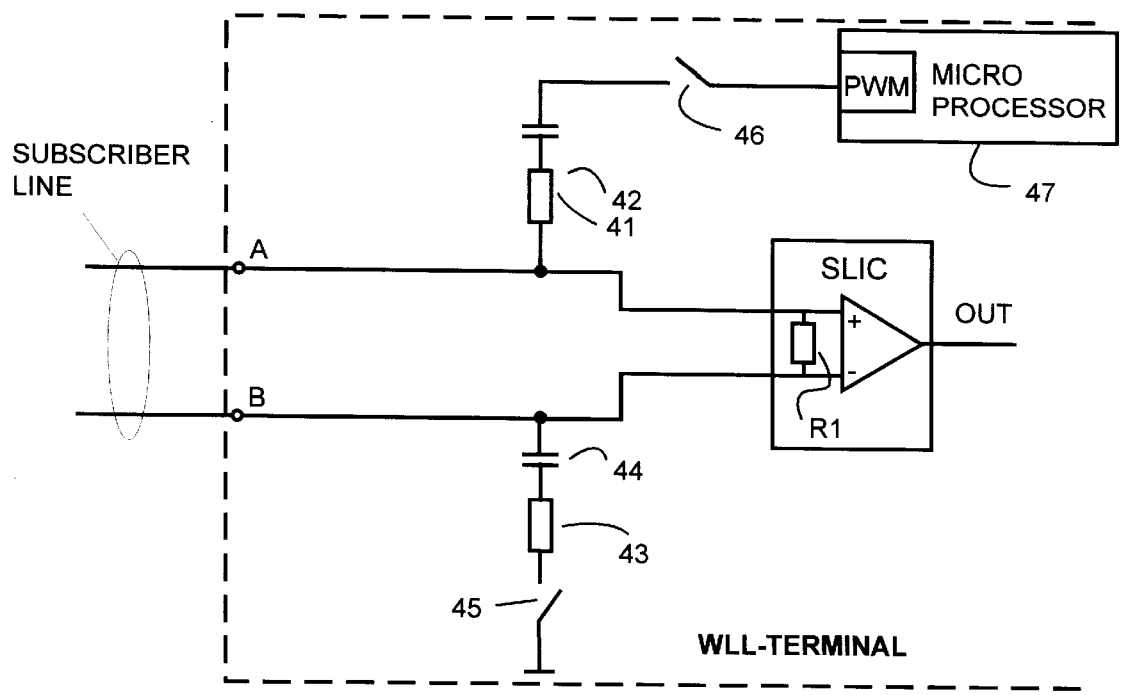
Figure 5:
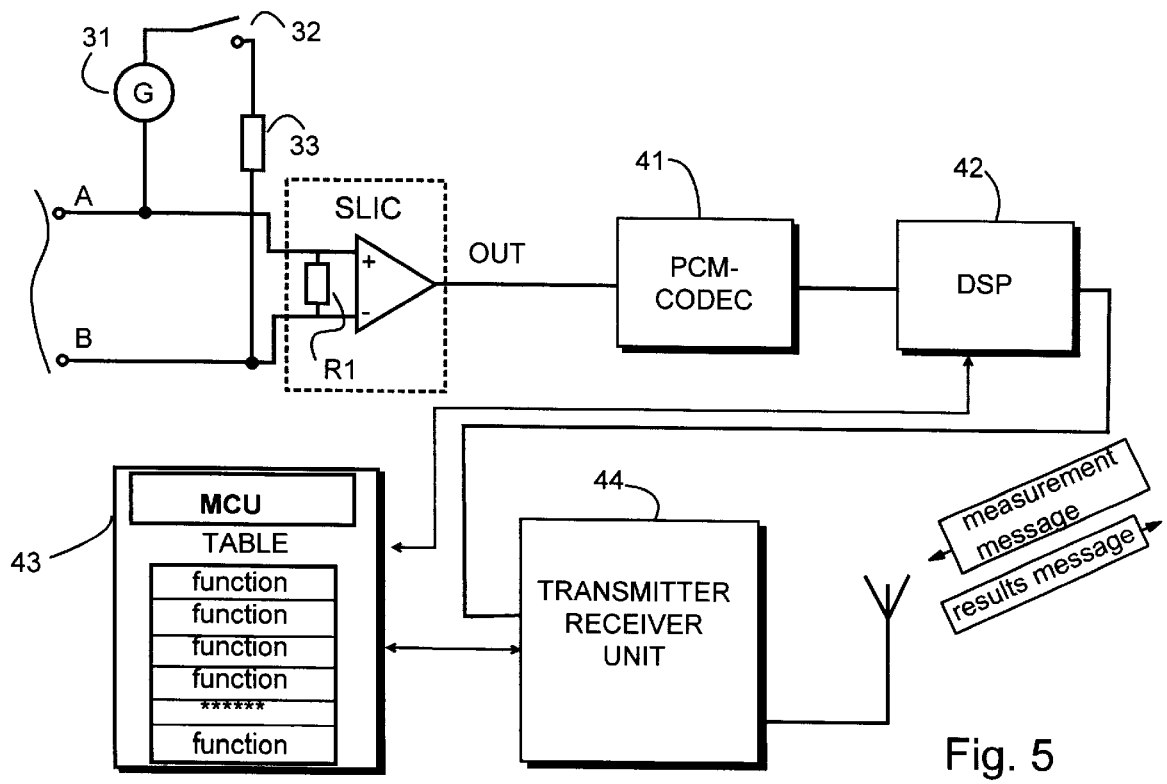
Figure 6:
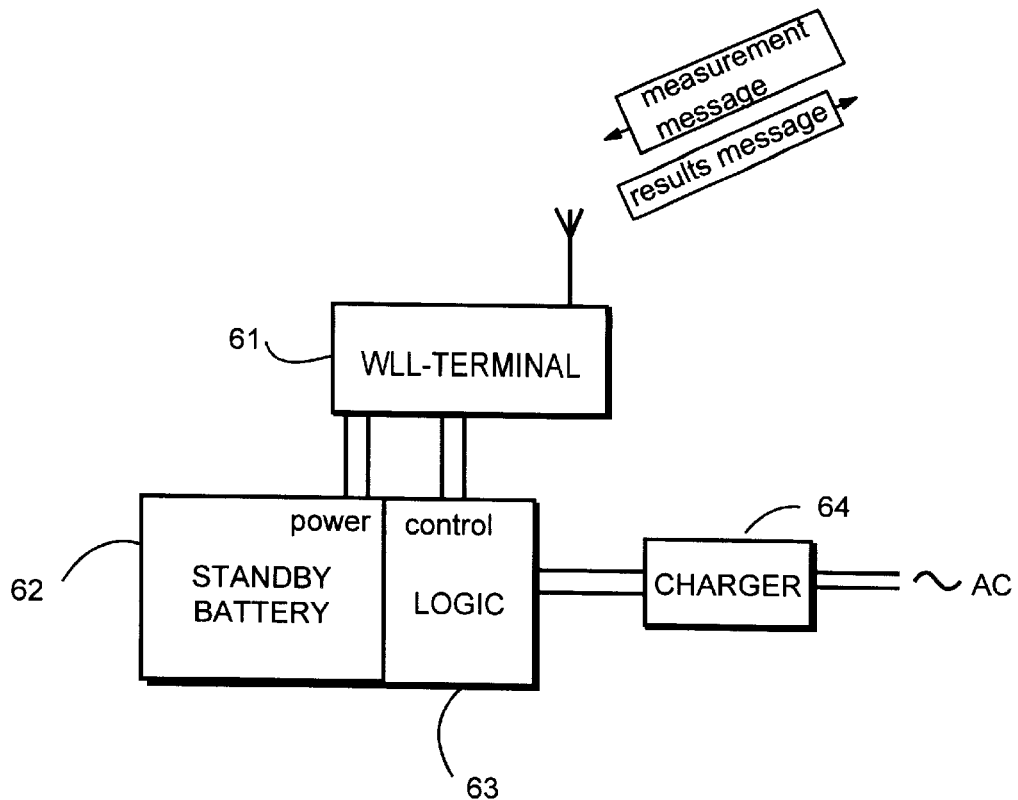
Figure 7:
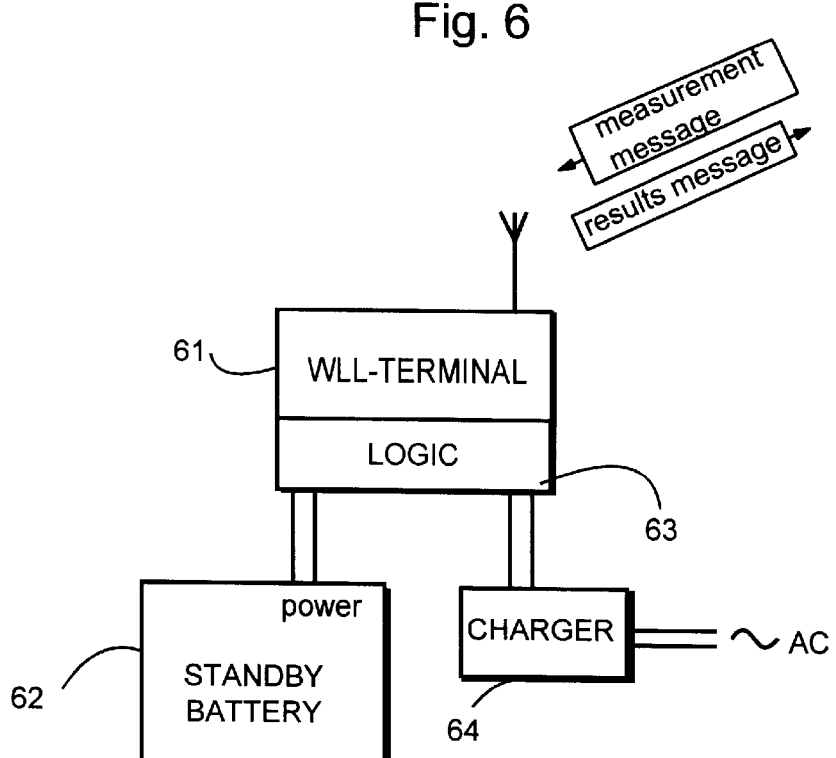
Figures 8, 9:
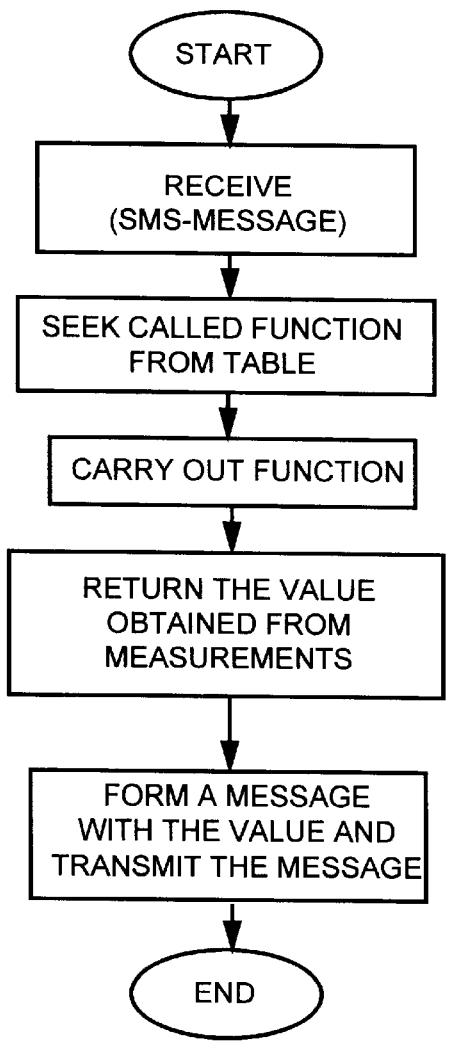
Figure 10:
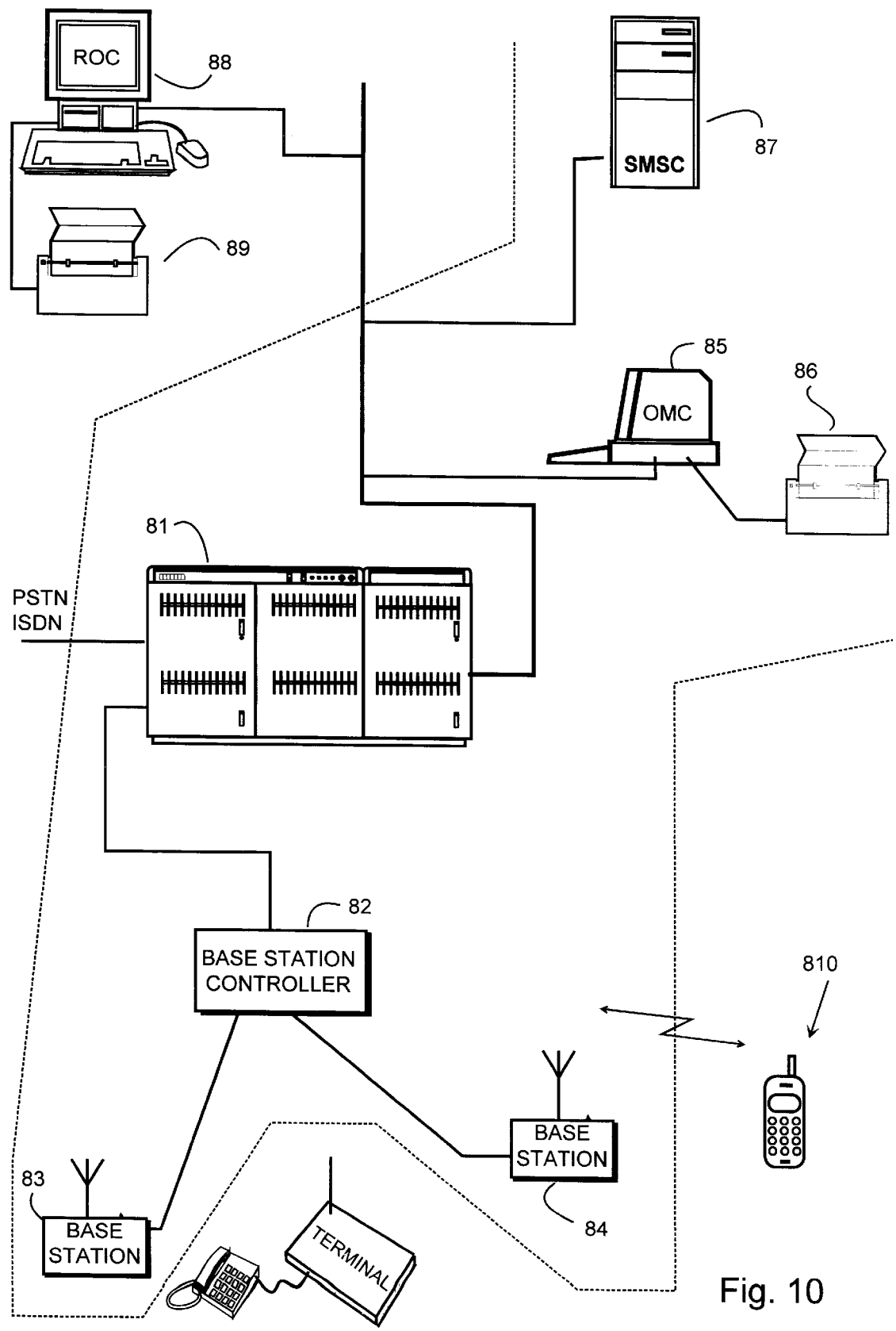

The invention is described more closely in the following with references to the enclosed schematic Figures, of which FIG. 1 shows the known principle of loop measurement, FIG. 2 shows a WLL system, FIG. 3 is a simplified view of a connection according to the invention, FIG. 4 shows a practical embodiment of the connection, FIG. 5 shows a connection according to the invention in a digital terminal, FIG. 6 depicts a first arrangement for testing a terminal's standby battery, and FIG. 7 depicts another arrangement for testing a terminal's standby battery, FIG. 8 is a flow diagram of functions performed by a terminal, FIGS. 9A and 9B show frames suitable for message transmission in an analog cellular network, and FIG. 10 shows a digital cellular network supplemented with elements according to the invention.

DETAILED DESCRIPTION OF THE INVENTION

FIG. 3 shows a connection arrangement in a WLL terminal which allows loop measurements. The markings in the Figure correspond with the markings in FIG. 1 in applicable parts. An essential difference as regards the subscriber line is that the subscriber line in FIG. 1 running from the telephone to the exchange is long, even tens of kilometers, whereas in the WLL case in the figure the length of the subscriber line, that is, the line running from the subscriber terminal equipment to the terminal, is short, typically only a few meters, and that the subscriber connection thereafter is a radio link.

Only circuits essential to the invention are shown in the WLL terminal demarked by a broken line. They comprise a commercial SLIC circuit intended for telephone exchanges and available from several suppliers, and alternating voltage generator 31, switch 32 and resistance 33. The SLIC input is formed by wires A and B of the twin cable which is the subscriber line. A series connection of alternating voltage generator 31, controlled switch 32 and resistance 33 is connected between the input poles of the circuit. The resistance value of resistance 33 is equal to that of the SLIC input impedance R1, which for its part is approximately equal to the terminal impedance of the subscriber terminal equipment's audio range, that is, the impedance measured at low frequencies (also reference number R1) in an off-hook state. When the subscriber line's plug is pushed into the adaptor socket of the terminal, both the subscriber loop, the alternating voltage generator and the SLIC circuit are connected and fitted in parallel as seen from the connecting point.

It was noted in connection with the prior art description that commercial SLIC circuits as such contain loop identification based on a comparison of the subscriber line's current consumption with a limit value which can be set. This function allows identification of the telephone's hook state, that is, whether it is on-hook or off-hook. The method in accordance with the invention also allows separation from one another of the states a) off-hook telephone (that is, there is a call in progress, the hook has been forgotten on the table or is badly replaced) and b) a short-circuit in the subscriber line and the states c) subscriber line off (that is, the line is really off or broken or the telephone's ringing circuit is faulty or broken) and d) the hook is on and the ringing circuit can be seen (that is, all is okay).

These states can be identified just by feeding alternating voltages of different frequencies to the subscriber line from a separate signal generator. The states can be concluded by comparing with each other at different frequencies signal levels obtained from the output of the SLIC amplifier. Concluding may be done in several ways of which an advantageous one will be presented hereinafter.

When no loop measurements are done, switch 32 is open and the SLIC circuit is in a passive state. When the terminal receives from the network a message prompting loop measurement, switch 32 is closed and alternating voltage generator 32 is activated.

Several different frequencies may be formed with the generator and their effect is illustrated below with the aid of Table 1.

TABLE 1

| Generator frequency | SLIC output level | Hook | Conclusion |
| --- | --- | --- | --- |
| A(f) | 0 | off/on | short-circuit |
| A(f) | ½ A | off/on | subscriber line off or loose |
| A(f) > ringing circuit cutoff frequency | reducing | on | ringing circuit OK |
| A(f) > ringing circuit cutoff frequency | does not change | on | fault in ringing circuit |
| A(f) < ringing circuit limiting frequency | minimum value | off/on | DC impedances are received |
| A(f) > ringing circuit cutoff frequency | default values | off/on | audio range impedances are received |

When the generator supplies any frequency A(f), wherein A is the amplitude and f the frequency, and the SLIC output level is 0, it is known that the subscriber line is in short-circuit. This is so because as seen from the terminal the resistance between wires A and B is zero or a few ohms, so this short-circuits the generator branch, and for this reason no signal is obtained from the SLIC receiver output. This is the case whether the hook is off or on.

When the generator supplies any frequency A(f) and the SLIC output level is ½A, it is known that the subscriber line is off or loose. This is so because since the impedance towards the subscriber line is infinite, the voltage given by the generator is divided equally between generator resistance 33 and the SLIC input resistance R1 (the resistances are equal). Such a voltage is thus received from the SLIC output whose amplitude is exactly one-half of amplitude A of the voltage of generator 31. This is the case whether the hook is off or on. The frequency given by the generator has no significance in this case either.

The frequency is of significance when the subscriber line is okay and when the operation of the telephone's ringing circuit, the telephone's direct voltage resistance and audio range impedances are examined. The cutoff frequency of the telephone's ringing circuit, which is shown as a RC series connection in FIG. 3, is in the range 0.5 . . . 1 kHz. When the frequency of the alternating voltage supplied by generator 31 is increased above this, that is, A(f)>cutoff frequency of the ringing circuit, and A(f) is, for example, an alternating voltage of 4 kHz, capacitor C of the ringing circuit represents only a low resistance, so the subscriber line impedance is reduced, leading to a reduction of the SLIC input voltage and so also of the output voltage. It can be concluded from this that the ringing circuit is in order. The on-hook state is known.

If in the previous measurement, wherein A(f)>cutoff frequency of the ringing circuit, the SLIC output level is not changed, the conclusion will be that the ringing circuit is faulty.

When the generator frequency is reduced below the cutoff frequency of the ringing circuit, that is, A(f)<cutoff frequency of the ringing circuit, and A(f) is, for example, an alternating voltage of 50 Hz, it is possible to conclude direct current impedances corresponding to the hook state. If the hook is on, the SLIC input sees the subscriber line DC impedance as high and if the hook is off, whereby the ringing circuit has no effect, the SLIC circuit sees the value of the telephone terminal impedance R1.

By having the generator supply the frequency A(f)>cutoff frequency of the ringing circuit one finds out whether the audio range impedances are such as they should be.

When the SLIC circuit is connected to a PCM codec, it could be thought that the codec's signal generator would be used whose signal is available out from the circuit through the SLIC's internal supply amplifier. However, it can not be used as a signal generator 31 in accordance with the invention, because the hybrid function of the SLIC circuit prevents the codec's signal from being heard in the receiver branch, if no phase difference is brought about between the sent signal and the received signal. A phase difference may result naturally when using the SLIC circuit in the traditional manner in the telephone exchange of a fixed network, whereby the subscriber line is often long enough and the sent signal is reflected back from the subscriber terminal equipment end. In the WLL case, the subscriber line is far too short for any phase difference to be produced.

The loop measurement connection of FIG. 3 is preferably implemented in accordance with FIG. 4. According to FIG. 4, a measurement signal is brought by way of switch 46, capacitor 42, which attends to the DC difference, and resistance 41 to one wire A of the twin cable. For the time the measurement takes place the other cable branch is connected with switch 45 to the circuit's earth from the viewpoint of alternating voltage through capacitor 44 attending to the DC difference and through resistance 43. The capacitors are needed to keep the functioning point of the SLIC input amplifier in a linear range and they must be dimensioned so that they do not affect the measurement result when lower measurement frequencies are used. A square wave in a voltage range of 0 V–5 V and available from the PWM gate of a microprocessor located in the terminal is used as signal generator. Since the signal also contains high frequencies besides a low basic frequency, these frequencies must be filtered by a low pass filter. Filtration can be done easily when implementing the measurement algorithms with a signal processor even otherwise included in the terminal.

Switches 45 and 46 can be implemented with BJT transistors or FETs. As can be noticed, implementation of the measurement function requires only a few resistances and capacitors as well as a couple of switch transistors, but since the switches are in the measurement circuit and they are DC separated from the subscriber line, the implementation is cheap and simple.

FIG. 5 shows a principle view of a digital WLL terminal, wherein blocks essential to the invention are shown besides the already described SLIC circuit and the connection 31, 32, 33 generating an alternating voltage to the subscriber loop. The adaptor part of the terminal already has a PCM codec 41 converting the PCM vocal signal from the network into an analog signal and, correspondingly, the analog signal from the subscriber terminal equipment into a PCM coded signal for further transmission on the radio way. The PCM block here contains both A/D and D/A converters. Baseband signal processing is performed in signal processor DSP, 42, which forms transmission frames from a bit stream produced by the PCM block from an analog signal arriving from the subscriber terminal equipment. The transmission frames are channel coded and a RF unit 44 transmits transmission frames to the base station. The function is similar when the transmission frames are sent by the base station and received by the terminal.

Operations are controlled by the terminal's MCU (Main Controller Unit) 43 which contains a microprocessor and the necessary software. All this is evident to a professional in the field.

According to the invention, the operator transmits such messages to the terminal which contain a prompt to do a certain measurement function. In the figure this is illustrated by a "measurement message" box. Correspondingly, the terminal after having performed the measurements sends a measurement report message to the operator which in the figure is illustrated by a "result" message. Depending on the WLL application network the standard message of the network or some other suitable communication mechanism is always used when possible.

Messages arriving through the network may also contain an instruction to perform a test of the condition of standby batteries. Standby batteries are used to ensure the electric power supply for the terminal in case of a failure in the supplying electric power mains. If there is no electric power mains, the batteries function as the primary power source. However, the advantage given by standby batteries will not be achieved if the standby batteries are charged too low for some reason. By adding a battery condition test to the remote test functions the operator may inform the subscriber in good time about insufficiently charged batteries and the subscriber may then take the necessary steps in time.

FIGS. 6 and 7 show an arrangement for testing batteries. For the test a logic unit 63 is required which controlled by the terminal performs the function specified by the measurement message, that is, the battery test. The logic unit may be located in the standby battery unit as in FIG. 6 or it may be located as a part of the WLL terminal as in FIG. 7. The following tasks are assigned to the logic unit:

to turn on and off the charger's charging current to the battery, to connect a test load to the battery voltage, to read the battery voltage and possibly, to examine the battery size and manufacturer.

When the measurement message contains a message to perform a standby battery condition test, a battery load test is performed. The main control unit controls the MCU logic component 63 to turn off the supply current of charger 64 from the batteries. The battery voltage is then read through the control line. Since the battery voltage is an analog quantity, one of the MCU's A/D lines must be used for this purpose. After reading the battery voltage the logic unit connects a test load between the battery poles, discharges the batteries to the test load for a predetermined time and again reads the battery voltage after this time has passed. Thus information has been received on the initial battery voltage, discharge current and voltage after the discharge time. This information is put into the results message and transmitted into the network. Before the transmission the terminal may perform initial processing of the results. By analyzing the results the network generates a warning or alarm message as required which is passed on to the terminal.

The battery size and manufacturer may also be examined. This is done by using some known method, such as by examining that resistance located in the battery which indicates the battery size and manufacturer. The MCU's A/D line is used also for this purpose.

It is also possible to examine the battery condition without using a separate logic unit, whereby the check is performed only when the charger loses its supply power. When the terminal finds that the charger gives no current, whereby the terminal is dependent on power supply from the battery, it measures for a certain time the voltage drop of the battery over that time. It transmits the results to the network either after or without preliminary processing.

This method has the advantage that no separate logic unit is required to disconnect the charger from the battery and to reconnect it, nor to connect a separate test load to the battery poles.

FIG. 8 shows a block diagram of the steps taken by the terminal after it has received a measurement message. The functions start after the terminal has received a message by radio containing a prompt to perform a measurement and information about which measurement functions it must perform. The terminal then seeks a specification of measurement functions from a table stored in the memory, FIG. 5. Each specification is a certain instruction set which is carried out under processor control. The measurements may be loop measurements and measurements relating to the terminal adaptor and/or to the operation of the radio unit. After the measurements have been performed and the measurement values obtained, the terminal forms a message in accordance with the system including measurement values and, if required, also information about where the measurements were performed. The information may be a reference to some identifier in the received measurement message. The terminal then assumes its idle state. Measurement messages can be received and results messages sent also when the user has a traffic connection with the network, that is, during a call, while a fax is being sent etc.

If the system is an analog NMT-900 cellular system, the message starting the measurement function can be sent with the frame 1*a* defined in item 4.3.2.1 of NMT specification NMT DOC 900-1 of January 1995 (calling channel indication, general), 1*a*′ (calling channel indication for MS group A), 1*a*″ (calling channel indication for MS group B) or 1*b* (combined calling and traffic channel indication).

FIG. 9A shows the general shape of the fields of frames to be sent in a downlink direction. After the fields for channel number, prefix, traffic area number and telephone identifier there is a field reserved for data of 3 digits (hexadecimal characters), that is, of 12 bits. In frames 1*a* and 1*b* the information field and the telephone identifier field together form a field reserved for additional information, whereby a field for ten numbers (digits) is obtained. On certain conditions the telephone identifier field may also be used in frames 1*a*′ and 1*a*″ for additional information. In these standard frames at least the bits of the information field may be used for defining the measurement task. With twelve bits, a total of $2^{12}$ different tasks can be defined, which is enough. One number is sufficient to tell that the task is a measurement task to be performed by the terminal, whereby $2^8$=256 alternatives still remain for defining the task.

Having received the message the terminal searches the table in its memory for the definition of a function corresponding to the bit pattern, performs the function and transmits the results to the network. They can be sent in a standard according to FIG. 9B in a frame structure of the uplink direction especially in the frames defined in items 10*a* (call acknowledgment from MS on calling channel and accesses on access channel, shortened frame) and 10*d* (call acknowledgment from MS on the alternative type of call on combined CC/TC, shortened frame) of the specification.

Their 5-digit information field (20 bits) is sufficient for identifying all possible measurement results and measurement tasks. Such a procedure is possible that in the message 1 digit identifies the performed measurement task and the remaining four digits are used for telling the measurement results. Four digits means 16 bits, which is a sufficient number for stating the results.

The above description of how to use frames is only meant to be suggestive and to illustrate that a frame structure in accordance with the NMT-900 standard as such allows relaying of measurement task messages and measurement report messages in an analog cellular network.

In a WLL system based on a digital cellular system it is advantageous to use SMS (Short Message Service) of the system or a protocol built on SMS for sending the message starting the measurement function. The short message service of the GSM cellular system is defined e.g. in standard ETS 300 502.

A short message may be of a point-to-point type, whereby it is possible to distinguish between SMS-MT/PP (Mobile Terminating Short Message Service, Point-to-Point) and SMS-MO/PP (Mobile Originating Short Message Service, Point-to-Point). In addition, the network may send short messages of the broadcast type, SMS-CB (Cell Broadcast Short Message Service). The maximum length of a short message is 140 bytes or 160 ASCII characters of 7 bits each. The cellular network has a special SMSC (Short Message Service Center) storing, buffering and routing messages forward. In practice, SMSC is a work station. When a short message is sent either from a PSTN network or from a mobile station, it is always sent to a service center which then sends it further. Thus all short messages pass through the SMSC. When a short message terminates in a mobile station, the GSM standard also allows the receiver's reply/acknowledgment in the short message, which reply is relayed further by SMSC to the sender.

FIG. 10 shows a WLL system based on a GSM/DCS cellular system. Those elements in the cellular system are shown which are used in transmission of measurement messages and measurement result messages according to the invention. It should be noted that almost all elements already exist in the present cellular network. Elements relating to the present cellular system are located inside the broken line. Such elements are the mobile switching center 81, through which the cellular network is connected with the PSTN/ISDN network, the cellular network's OMC (Operation & Maintenance Center), which is e.g. a work station running the network's management software. A printout unit 86 is connected to the work station. In addition, the network contains a SMSC (Short Message Service Center) 87, in practice a work station with software, and base station controllers 82 and base stations 83, 84.

Besides the existing elements, the arrangement in accordance with the invention needs a network item indicated by reference number 88, that is, a ROC (Remote Operation Center), which may be a work station or in small WLL networks an ordinary PC in general use running the management software for the WLL terminals. It is connected to a printout unit 89 for printing out reports on paper. It is possible to integrate ROC with OMC or they may be separate as in the figure.

ROC 88 forms measurement task messages containing task definitions and the address of the WLL terminal or terminals which are the object and sending the short message to service center 87, which in a known manner routes the short messages to their destination. ROC forms, for example, a message concerning a measurement task for WLL terminal 810. The message starts from ROC with a standard SMS protocol and goes to short message service center 87, which routes it to mobile switching center 81 and by way of base station controller 82 to the base station 84 in the location area of which terminal 810 is located. The base station sends the short message on to the WLL terminal 810 which is the target and which receives the message and then functions as described in connection with FIGS. 5 and 6. After the measurements the terminal forms a short message which it addresses to remote operation center ROC 88. In accordance with the normal short message protocol, the short message containing measurement results proceeds to short message service center 87, which passes it on to ROC 88.

The above is a presentation of a method for sending measurement messages by using short message service. Such an arrangement does not require any changes in the network or in the protocols used therein. The scope of protection of the claims also allows many other different ways of implementing the invention. Different manufacturers may also use other improved mechanisms for calling the functions in the terminal from a remote operation center. These mechanisms are data-transmission protocols developed with SMS as a basis. One such is the Radio Local Net (RLN) transmission protocol developed by the applicant, which may be used for sending such calls through the transmission network which start desired functions in a remote terminal.

We claim:

1. A terminal in a radio system of a wireless subscriber connection, wherein subscriber terminal equipment is adapted to be connected with a connecting line to an adapter unit of the terminal, the terminal comprising a subscriber line interface circuit (SLIC) for connecting the subscriber terminal equipment to the terminal, and means for generating an alternating voltage adapted to be connected in parallel with an input of the subscriber line interface circuit (SLIC) and the connecting line, wherein, in response to a message received by radio, desired tests are performed by connecting the alternating voltage.

2. Terminal as defined in claim 1, wherein the desired tests include at least one selected from the group consisting of tests concerning a condition of the terminal, tests concerning a condition of the connecting line, tests concerning a condition of the subscriber terminal equipment and tests concerning a condition of a battery.

3. Terminal as defined in claim 1, further comprising means for forming a message containing the test results.

4. Terminal as defined in claim 1, wherein the terminal comprises a table stored in a memory which contains function specifications, and wherein in response to the message starting the test functions the function means searches the table for the test function specification and performs test tasks according to the specification.

5. Terminal as defined in claim 1, wherein the subscriber terminal equipment is connected to the terminal by the connecting line.

6. Terminal as defined in claim 1, further comprising a signal processor functionally connected to an output of the subscriber line interface circuit (SLIC) to perform calculation operations required in the tests.

7. Terminal as defined in claim 1, wherein means for generating the alternating voltage is formed by an alternating voltage signal available from a microprocessor.

\* \* \* \* \*